(12) United States Patent
Woodhead

(10) Patent No.: US 6,790,807 B2
(45) Date of Patent: Sep. 14, 2004

(54) ZIRCONIUM/METAL OXIDE FIBERS

(75) Inventor: James L. Woodhead, Banbury (GB)

(73) Assignees: Rothmans, Benson & Hedges Inc., Ontario (CA); AMR International Corp., Bridgetown (BB)

( * ) Notice: Subject to any disclaimer, the term of this patent is extended or adjusted under 35 U.S.C. 154(b) by 55 days.

(21) Appl. No.: 10/242,676

(22) Filed: Sep. 13, 2002

(65) Prior Publication Data

US 2003/0069132 A1 Apr. 10, 2003

Related U.S. Application Data

(60) Provisional application No. 60/318,614, filed on Sep. 13, 2001.

(51) Int. Cl.[7] .................................................. B01J 23/10
(52) U.S. Cl. ...................................... 502/302; 502/349
(58) Field of Search ................................. 502/302, 349

(56) References Cited

U.S. PATENT DOCUMENTS

| | | |
|---|---|---|
| 3,846,827 A | 11/1974 | Eppler Jr. |
| 3,860,529 A | 1/1975 | Hamling |
| 3,891,595 A | 6/1975 | Birchall |
| 3,992,498 A | 11/1976 | Morton et al. |
| 4,181,532 A | 1/1980 | Woodhead |
| 4,231,893 A | 11/1980 | Woodhead |
| 4,356,106 A | 10/1982 | Woodhead et al. |
| 4,788,045 A | 11/1988 | Colombet et al. |
| 4,927,622 A | 5/1990 | Jade |
| 4,937,212 A * | 6/1990 | Funkenbusch et al. ..... 501/95.1 |
| 5,040,551 A | 8/1991 | Schlatter et al. |
| 5,053,214 A | 10/1991 | Jada |
| 5,075,275 A | 12/1991 | Murakami et al. |
| 5,094,222 A | 3/1992 | Fukuda et al. |
| 5,112,781 A | 5/1992 | Jada |
| 5,165,899 A | 11/1992 | Delaunay et al. |
| 5,195,165 A | 3/1993 | Ono et al. |
| 5,238,625 A | 8/1993 | Sakurai et al. |
| 5,468,548 A | 11/1995 | Giamei et al. |
| RE35,143 E | 1/1996 | Funkenbusch et al. |
| 5,759,663 A | 6/1998 | Hounsel |
| 5,911,944 A | 6/1999 | Kitaoka |
| 5,944,025 A | 8/1999 | Cook et al. |
| 5,965,481 A | 10/1999 | Durand et al. |

FOREIGN PATENT DOCUMENTS

| | | | |
|---|---|---|---|
| CA | 2274013 | 6/1998 | |
| GB | 1181794 | * 2/1970 | ............ B01J/13/00 |
| GB | 1322723 | 7/1973 | |
| GB | 1402544 | 8/1975 | |
| GB | 2059933 A | 4/1981 | |
| GB | 2236493 A | 10/1991 | |
| JP | 03060738 | 3/1991 | |

* cited by examiner

*Primary Examiner*—William Cheung
(74) *Attorney, Agent, or Firm*—Banner & Witcoff, Ltd.

(57) ABSTRACT

A zirconium metal oxide fiber comprises zirconium oxide and a metal oxide. The fiber is made by adding a metal oxide in a suitable form to a colloidal dispersion of an amorphous zirconium polymer. The mixed colloidal dispersion is subsequently made into a fiber. The fiber may be used as a substitute for glass fiber in the manufacture of paper and paper-like materials. The fiber's thickness is substantially uniform and has a length usually in excess of one micron.

32 Claims, No Drawings

ZIRCONIUM/METAL OXIDE FIBERS

Benefit of the Sep. 13, 2001 filing date of U.S. Provisional Application Serial No. 60/318,614 is hereby claimed. U.S. Provisional Application Serial No. 60/318,614 is hereby incorporated by reference.

STATEMENT OF THE INVENTION

A zirconium/metal oxide fibre comprises zirconium oxide and a metal oxide. The fibre has sufficient structural strength such that for example it may be used as a substitute fibre for glass fibre in the manufacture of paper and paper-like materials. Preferably the fibre's thickness is substantially uniform and has a length in excess of 1 micron.

The metal oxide fibre is made by adding a metal oxide in a suitable form, preferably as a solution of the metal salt (or a colloidal dispersion of the metal) to a colloidal dispersion comprising an amorphous zirconium polymer of the formula:

$$[Zr_4(OH)_{12}(X)_2(H_2O)_4]_n(X)_{2n} \cdot 2nH_2O \qquad (I)$$

wherein X is a zirconium polymer compatible anion and n is a whole number.

The mixed colloidal dispersion is subsequently made into a mixed metal oxide fibre. Preferably the colloidal dispersion of the zirconium polymer of formula (I) is made in accordance with a modification to the process described in U.K. Patent 1,181,794 where, for example, zirconium carbonate or zirconium hydroxide is reacted to form the colloidal dispersion containing the polymer of formula (I).

According to a most preferred embodiment, the invention relates to a zirconium/metal oxide fibre that comprises zirconium oxide and a lanthanide oxide. Preferably, the lanthanide/zirconium oxide fibre is made by adding a solution of a lanthanide, most preferably lanthanide nitrate (or a lanthanide colloidal dispersion) to a colloidal dispersion comprising an amorphous zirconium polymer of the formula:

$$[Zr_4(OH)_{12}(NO_3)_2(H_2O)_4]_n(NO_3)_{2n} \cdot 0.2nH_2O \qquad (I)$$

The lanthanide nitrate solution is preferably formed by reacting a lanthanide carbonate, hydroxide or oxide with nitric acid.

It was surprisingly found that one could add a highly concentrated solution of a metal salt (or metal oxide colloidal dispersion) to the colloidal dispersion of zirconium polymer of formula (I) creating a mixed colloidal dispersion whereby the charge balance remains intact preventing adverse precipitation within the mixed colloidal dispersion. The preferred ratio of X to zirconium in the polymer of formula (I) is in the range of about 1.0:0.98 to 1.0 to 1.3 to ensure the colloidal dispersion formation although, for reasons later discussed, the ratio may fall outside this range. The pH of the colloidal dispersion is preferably in the range from about 1.5 to about 2. Due to the viscoelastic properties of the zirconium polymer of formula (I), the zirconium polymer of formula (I) can act as a spinning aid such that the concentrated mixed colloidal dispersion has a viscoelasticity that is suitable for fibre formation by techniques such as spray drying, drawing or blow spinning. The resultant green fibres are of a stable dried gel. These green fibres are heat treated to drive off volatiles to form crystalline fibres comprising zirconium oxide and metal oxide.

Although the zirconium polymer of formula (I) has a viscoelasticity that is suitable for fibre formation on its own, other spinning agents may be incorporated into the mixed colloidal dispersion such that the synergistic combination of both the zirconium polymer of formula (I) and at least one other spinning agent facilitates fibre formation. Preferably, these other spinning aids are organic based and are fugitive (volatile) during heat treatment. Examples of exemplary spinning aids include polyethylene oxide and polyvinylpyrrolidone.

BACKGROUND OF THE INVENTION

It is known that metal oxide catalysts can be incorporated on the surface of various types of fibres for decomposing various compositions or for purifying exhaust gases. For example, U.S. Pat. No. 5,094,222 describes a mixture of ceramic fibres containing an oxidation catalyst for decomposition of fats and oils. The ceramic fibres are made from at least one of the following oxides: silicon oxide, zirconium oxide and aluminum oxide. The oxidation catalyst can be selected from at least one of a variety of metal oxides. U.S. Pat. No. 5,165,899 describes a porous fibrous structure for purification of exhaust gases. The fibrous structure is made of metal alloy fibrils of the MCrAlX type where M is a matrix chosen from iron, and/or nickel and/or cobalt and X is chosen from zirconium, yttrium, cerium and lanthanum metal. Japanese Patent 3,060,738 describes cerium oxide mixed and other components which were mixed with an alumina-silica ceramic fibre to provide a catalyst that decomposes soot. Also, U.S. Pat. No. 3,860,529 describes Group III B metal oxide impregnated zirconia fibres.

Metal oxide catalysts have also been used in an extruded form. Canadian Patent 2,274,013 describes an extruded form of a ceria/zirconia mixture to treat exhaust gases.

Similarly, metal oxide catalysts can also be used as coatings on various types of fibres for primarily purifying exhaust gases. See for example U.S. Pat. Nos. 5,040,551; 5,075,275; 5,195,165; 5,759,663; 5,944,025; 5,965,481 and U.K. Patent 2,236,493. For instance, to purify exhaust gas, U.S. Pat. No. 5,075,275 describes a catalyst carrier, such as porous heat resistant fibres, which have been coated with cerium and barium oxides. U.S. Pat. No. 5,759,663 describes a high temperature resistant lath of woven ceramic where the fibres of the lath are coated with chromium oxide, silicone carbide and cerium oxide. U.K. Patent 2,236,493 describes a honeycomb filter impregnated with cesium, copper, and cerium or lanthanum to oxidize carbonaceous particles.

All of the above-mentioned references either refer to metal oxides as incorporated on the surface of fibres, as an extruded form, as coatings on fibres, or as impregnating the fibre. Several references exist that refer to metal oxides in fibre form only and further describe various processes for making such fibres. For instance, U.S. Pat. No. 5,911,944 describes a fibre made by dispersing a raw material containing at least one metal hydrate and hydrated metal compound in an alcohol-based solvent (Bpt.>70° C.) forming a colloidal dispersion. The colloidal dispersion is heated not higher than 100° C., which produces a polymer of the raw material. The polymer is converted to a complex. The complex is concentrated until it has spinnability. The colloidal dispersion is stretched to form a fibre precursor that causes gelation. The gelatinized fibre precursor is heated to produce a fibre. U.S. Pat. No. 3,846,527 describes making inorganic fibres that normally would not be spinnable. This was done by dry spinning a solution or colloidal dispersion with a linear polymeric fibre-forming material. U.K. Patent 1,402,544 describes the preparation of mixed metal oxide fibres by using metal alkoxide(s) capable of converting to spinels. Rare-earth metals are not known to form spinels. U.K. Patent 1,322,723 describes a process for producing fibrous material wherein zirconium oxide is capable of reacting chemically with silica fibrils to assist in bonding the fibrils together.

U.K. Patent 2,059,933 describes the preparation of alumina or zirconia fibres by spinning an aqueous solution of the corresponding metal salt, a precursor to the metal oxide fibre. The specific examples relate only to formation of alumina fibres. These particular fibres can be made from an aqueous solution containing other metals whose salts are hydrolysed at a pH less than 7 to yield a mixed metal fibre. To prevent gelling or precipitation within the aqueous solution, aliphatic or aromatic amines are added to the solution to remove excess anions to create a more desirable solution for fibre formation. In the present invention, however, excess nitrate anions within the zirconium polymer colloidal dispersion, as described in U.K. Patent 1,181,794, result in formation of spheres that would be detrimental to formation of our desired mixed metal oxide fibres.

Several patents have dealt with a Group IIA, a Group IIIA or a lanthanide metal oxide colloidal dispersion that can form gels, which can be used to make ceramic materials as described in U.S. Pat. No. 4,181,532. These colloidal dispersions can also be used as coatings, as described in U.S. Pat. No. 4,231,893. U.S. Pat. No. 4,356,106 describes a process for making a colloidal dispersion that involves using dry cerium oxide hydrate and a deaggregating agent to form a dry dispersible cerium compound.

Several references exist that refer, specifically, to various processes for making metal oxide/zirconium oxide fibres. U.S. Pat. No. 5,468,548 describes making reinforced fibres for high temperature composites consisting of a matrix and eutectic fibres dispersed in the matrix. The eutectic fibres can be selected from a series of metal oxides and the reference suggests several optional metal oxides including ceria and zirconia. The matrix and fibres are very specific in that the coefficient of thermal expansion of the matrix should be similar to the eutectic fibre. U.S. Pat. No. 3,891,595 discusses making friction materials that contain 40–85% of a synthetic inorganic refractory metal oxide fibre and 15–35% of a binder. The metal oxide fibre may contain zirconia and 1–10% of a stabilizer, such as alkaline oxides, yttria and rare earth oxides. 'Stabilizers' determine the crystal structure, e.g. tetragonal or cubic, and prevent the formation of the monoclinic crystal structure of zirconia. Stabilizers may also suppress growth of crystallites. A typical binder is a phenol-formaldehyde resin. U.S. Pat. No. 3,992,498 describes preparation of a fibre by making a solution of a polar solvent, a metal compound and an organic polymer. The metal can be zirconium. The solution is extruded into at least two gas streams and partially dried. The solution may also contain a lanthanide metal as a phase stabilizer or as a luminescent salt. U.S. Pat. Nos. 4,927,622, 5,053,214 and 5,112,781 describe a process that involves making an aqueous solution of zirconium-based granules and a phase stabilizer (1–35 wt %), such as calcium, yttrium, cerium and hafnium oxides, and fiberizing the solution. This particular process involves making and drying the zirconium-based granules before making the fibre. U.S. Reissued Pat. No. 35,143 describes a process for making a ceramic fibre that involves mixing crystalline zirconium grains, a zirconia compound, solvent and a phase stabilizer (more than 0 and up to 20 mol % of the stabilizer).

There are also several patents that discuss formations of colloidal dispersions of mixed metal oxides. For instance, U.S. Pat. No. 4,788,045 describes preparing a stabilized zirconia powder that involves mixing a zirconia hydrate colloidal dispersion (pH 0.5–5), containing acicular crystals with dimensions ranging from 10 to 50 nm, with a solution of a stabilizer such as cerium (<30 mol %). The powder formed can be used in ceramics. U.S. Pat. No. 5,004,711 describes forming a zirconia colloidal dispersion from a solution containing a zirconium salt and a stabilizer, such as yttrium, lanthanum, cerium, calcium and magnesium oxides. The solution is mixed with a strong base anion-exchange resin and the resulting colloidal dispersion is recovered. U.S. Pat. No. 5,238,625 describes a process for making a stabilized zirconia colloidal dispersion, which involves hydrolyzing a zirconium alkoxide using aqueous hydrogen peroxide in the presence of an acid and a stabilizing agent to form a hydrolysate. The hydrolysate is evaporated to form a dried hydrolysate, which is redissolved into an organic solvent.

The present invention employs the colloidal dispersion of an amorphous zirconium polymer of formula (I), which was described in U.K. Patent 1,181,794. Although this U.K. patent describes that a few percent by weight of a stabilizer such as lime or yttria may be added to the polymer of formula (I), it does not contemplate the addition of excessive amounts of the metal to the polymer of formula (I). In this respect, it was generally understood that the addition of higher proportions of metals would destroy colloidal dispersions, such as those of the polymer of formula (I).

SUMMARY OF THE INVENTION

According to an aspect of the invention, there is provided a process for making a zirconium/metal based fibre, the process comprising:

i) mixing a metal salt solution or metal oxide colloidal dispersion, wherein the metal is selected from the group consisting of at least one of a Group IIA metal, a transition metal, a Group IIIA metal and a Group IIIB metal, with a colloidal dispersion of an amorphous zirconium polymer of the formula:

$$[Zr_4(OH)_{12}(X)_2(H_2O)_4]_n(X)_{2n} \cdot 2nH_2O \qquad (I)$$

wherein X is a zirconium polymer compatible anion and n is a whole number from 1 to less than 200, to provide a mixed colloidal dispersion; and forming the mixed colloidal dispersion into the zirconium/metal based fibre.

According to another aspect of the invention, X is selected from the group consisting of $NO_3^-$, $Cl^-$ and $ClCH_2COO^-$ and more preferably, n is a whole number from 1 to about 100.

According to another aspect of the invention, the colloidal dispersion of the zirconium polymer has a ratio of X to zirconium in the range of about 1.0 to 0.98 to about 1.0 to 1.3 to maintain the polymer colloidal dispersion.

According to another aspect of the invention, the colloidal dispersion of the zirconium polymer has a pH in the range of about 1.5 to about 2.0 to maintain the polymer colloidal dispersion.

According to yet another aspect of the present invention, the metal is a lanthanide metal.

According to yet another aspect of the present invention, the metal is selected from the group consisting of at least one of cerium, yttrium, scandium, magnesium and calcium.

According to yet another aspect of the present invention, the metal salt solution is selected from the group consisting of at least one of a metal nitrate, metal chloride, metal acetate and metal perchlorate.

According to yet another aspect of the present invention, the metal oxide colloidal dispersion is made from a metal salt substrate selected from the group consisting of at least one of a metal nitrate, metal chloride, metal acetate and metal perchlorate.

According to yet another aspect of the present invention, at least one fugitive spinning agent is included in the mixing step. The fugitive spinning agent may be selected from the group consisting of polyvinyl pyrrolidone, polyethylene oxide, polyvinylalcohol, polyurethane, polyacrylic acid salt, polyacrylamide and polyvinylmethyl ether.

According to another aspect of the invention, the step of forming the fibre includes: concentrating the mixed colloidal dispersion of step i) such that the mixed colloidal dispersion becomes viscoelastic and forming the mixed viscoelastic colloidal dispersion into the fibre. Preferably, the mixed viscoelastic colloidal dispersion has a concentration ranging from about 300 g/L to 600 g/L.

According to another aspect of the invention, the fibre diameter is controlled by conventional drawing of said mixed viscoelastic colloidal dispersion.

According to another aspect of the invention, the fibre is dried and fired to form a crystalline zirconium oxide/metal oxide fibre. Preferably, the fibre is a zirconium oxide/cerium oxide fibre.

In yet another aspect of the invention, there is provides a use of an amorphous viscoelastic zirconium polymer of the formula:

$$[Zr_4(OH)_{12}(X)_2(H_2O)_4]_n(X)_{2n} \cdot 2nH_2O \qquad (I)$$

wherein X is a zirconium polymer compatible anion and n is a whole number from 1 to less than 200, as a spinning aid for making a zirconium/metal based fibre.

In yet another aspect of the invention, there is provided a synergistic combination of at least one fugitive spinning aid with an amorphous viscoelastic zirconium polymeric inorganic spinning aid of the formula:

$$[Zr_4(OH)_{12}(X)_2(H_2O)_4]_n(X)_{2n} \cdot 2nH_2O \qquad (I)$$

wherein X is a zirconium polymer compatible anion and n is a whole number from 1 to less than 200, said combination being suitable for forming a zirconium/metal based fibre.

In yet another aspect of the invention, there is provided a green zirconium/metal based fibre comprising a mixed colloidal dispersion of a metal, wherein said metal is selected from the group consisting at least one of a Group IIA metal, a transition metal, a Group IIIA metal and a Group IIIB metal, and an amorphous zirconium polymer of the formula:

$$[Zr_4(OH)_{12}(X)_2(H_2O)_4]_n(X)_{2n} \cdot 2nH_2O \qquad (I)$$

wherein X is a zirconium polymer compatible anion and n is a whole number from 1 to less than 200.

According to another aspect of the invention, X is selected from the group consisting of $NO_3^-$, $Cl^-$ and $ClCH_2COO^-$ and more preferably, n is a whole number from 1 to about 100.

According to another aspect of the invention, the metal of the zirconium/metal based fibre is selected from the group consisting of at least one of a Group IIA metal, a transition metal, a Group IIIA metal and a Group IIIB metal. Preferably, the metal of the zirconium/metal based fibre is a lanthanide metal. More preferably, the metal of the zirconium/metal based fibre is selected from the group consisting of at least one of cerium, yttrium, scandium, magnesium and calcium.

According to another aspect of the invention, the metal of the zirconium/metal based fibre is present in up to 50 weight % of the total equivalent zirconium oxide content.

According to another aspect of the invention, the formula has a ratio of X to zirconium in the range of about 1.0 to 0.98 to about 1.0 to 1.3.

DETAILED DESCRIPTION OF THE INVENTION

Accordingly, the present invention relates to a novel amorphous, green zirconium/metal fibre. The green fibre is a precursor to a zirconium/metal oxide fibre. Additionally, the present invention relates to a process for making such fibres and the general use of an amorphous zirconium polymer as a spinning aid.

The fibre is made by adding a solution of a metal salt solution (or a metal oxide colloidal dispersion) to a colloidal dispersion comprising an amorphous zirconium polymer of the formula:

$$[Zr_4(OH)_{12}(X)_2(H_2O)_4]_n(X)_{2n} \cdot 2nH_2O \qquad (I)$$

wherein X is a zirconium polymer compatible anion in providing a colloidal dispersion. The anion is an ionic constituent which ensures the formation of a stable dispersion. The anion is derived from a conjugate acid that provides pH in the dispersion which is most preferably about 1.5 to 2. Preferred anions may be selected from the group consisting of nitrate, chloride and chloroacetate. In formula (I), n is a whole number and preferably ranges from 1 to less than 200 and, preferably, from 1 to about 100.

The mixing is preferably done at a temperature from about 0 to 90° C., more preferably, from about 15 to 25° C. The preferred ratio of X to zirconium in the polymer of formula (I) is such that it ensures colloidal dispersion formation. The ratio of X to zirconium is, preferably, about 1.0:0.98 to about 1.0 to 1.3. However, it is understood the ratio of X to zirconium may fall outside this range, providing the resultant polymer of Formula I remains intact. The pH of the colloidal dispersion may preferably range from about 1.5 to about 2. The mixed colloidal dispersion is then concentrated, made into the green fibre, which is subsequently made into the zirconium/metal oxide fibre.

The colloidal dispersion of the zirconium polymer of formula (I) may be made in accordance with a modification to the process described in U.K. Patent 1,181,794. In order to facilitate an understanding of that process, it is outlined as follows. A dispersion or slurry of zirconium carbonate or zirconium hydroxide is reacted with an approximate equimolar amount of conjugate acid of the anion X which is preferably nitric acid, hydrochloric acid or chloroacetic acid, to provide the polymer of formula (I). The reaction is preferably carried out at about 50° C. to 70° C. with agitation. The reaction mixture is preferably maintained at a pH of about 1.5 to about 2.0 with an X to zirconium mole ratio of about 1.0:0.98 to about 1.0:1.3. These preferred conditions provide for the polymer formation and its stability in the dispersion.

The metal salt solutions that are useful for the preparation of the metal oxide fibre of this invention include a salt solution of at least one of a Group IIA metal, a transition metal, a Group IIIA metal and a Group IIIB metal. In particular, the metal salt solution may be made from the following metal salts: $YCl_3$, $Y_2(CO_3)_3$, $Y(C_2H_3O_2)_3$, $Y(NO_3)_3$, $CaCl_2$, $CaCO_3$, $Ca(C_2H_3O_2)_2$, $CaClO_4$, $Ca(NO_3)_2$, $MgCl_2$, $MgCO_3$, $Mg(C_2H_3O_2)_2$, $Mg(ClO_4)_2$, $Mg(NO_3)_2$, $CeCl_3$, $Ce_2(CO_3)_3$, $Ce(C_2H_3O_2)_3$, $Ce(ClO_4)_3$, and $Ce(NO_3)_3$.

In accordance with this invention, the solution of the metal salt is added to the colloidal dispersion of zirconium polymer of formula (I). A mixed colloidal dispersion is formed whereby the charge balance remains intact, preventing adverse precipitation within the mixed colloidal dispersion. This unexpected stability of the mixed colloidal dispersion is quite surprising. Thus, at least one type of metal salt solution may be added to the amorphous zirconium polymer to yield up to 50 weight % of the total equivalent zirconium/metal oxide content in the fibre. More preferably, the metal salt solution is added to yield up to 25 weight % of the total equivalent zirconium/metal oxide content in the fibre.

Metal oxide colloidal dispersions useful for the preparation of the metal oxide fibre of this invention include at least one of a Group IIA metal, a transition metal, a Group IIIA metal and a Group IIIB metal oxide colloidal dispersion. In particular, the metal oxide colloidal dispersion may be made from the following metal salts: $YCl_3$, $Y_2(CO_3)_3$, $Y(C_2H_3O_2)_3$, $Y(NO_3)_3$, $CaCl_2$, $CaCO_3$, $Ca(C_2H_3O_2)_2$, $CaClO_4$, $Ca(NO_3)_2$, $MgCl_2$, $MgCO_3$, $Mg(C_2H_3O_2)_2$, $Mg(ClO_4)_2$, $Mg(NO_3)_2$, $CeCl_3$, $Ce_2(CO_3)_3$, $Ce(C_2H_3O_2)_3$, $Ce(ClO_4)_3$, and $Ce(NO_3)_3$.

Preferably, the metal oxide colloidal dispersion is made by mixing an aqueous slurry of the metal salt with an acid to yield a hydrolyzable salt. The preferred acids are nitric acid or hydrochloric acid. Alternatively, if the initial metal salt is a nitrate or a chloride, this step of mixing the nitrate or chloride salt with acid is unnecessary. By either approach, the resulting hydrolyzable salt such as metal nitrate or metal chloride is hydrolyzed. Preferably, it is hydrolyzed and oxidized by adding a mixture of ammonium hydroxide and hydrogen peroxide. A metal hydroxide is obtained and admixed with water and a strong acid to yield a slurry. The strong acid may be, for example, nitric acid, hydrochloric acid or perchloric acid, and is capable of deaggregating the resulting insoluble metal hydrate. A residue from the slurry is then admixed with water to give the metal oxide colloidal dispersion.

Again, by adding the metal oxide colloidal dispersion to the colloidal dispersion of zirconium polymer of formula (I), a mixed colloidal dispersion is created. Surprisingly, the charge balance remains intact, preventing adverse precipitation within the mixed colloidal dispersion. Thus, the metal oxide colloidal dispersion may be added to the amorphous zirconium polymer to yield up to 50 weight % of the total equivalent zirconium/metal oxide content in the fibre. More preferably, the metal oxide colloidal dispersion is added to yield up to 25 weight % of the total equivalent zirconium/ metal oxide content in the fibre.

Cerous and/or ceric salts can be converted into cerium (IV) colloids relatively easily, which, like the cerium (III) salt solutions, can be readily mixed with the zirconium polymer of formula (I) without serious adverse effect on the dispersion. For example, in one particular embodiment, a zirconium/cerium oxide fibre is made by adding a solution of cerium nitrate to the polymer of Formula (I). The cerium nitrate solution is made by mixing cerium carbonate with nitric acid or by dissolving cerium nitrate in water. The solution is then admixed with a colloidal dispersion comprising the preferred amorphous zirconium polymer of the formula:

$$[Zr_4(OH)_{12}(X)_2(H_2O)_4]_n(X)_{2n} \cdot 2nH_2O \qquad (I)$$

wherein X is preferably $NO_3^-$. The mixing is done at approximately 15 to 25° C.

In a second embodiment, a zirconium/cerium oxide fibre is made by an alternative route. The zirconium/cerium oxide fibre is made by adding a colloidal dispersion of cerium nitrate to the zirconium polymer of formula (I). The dispersion is made by admixing an aqueous slurry of cerium carbonate with nitric acid. The resulting cerium nitrate is hydrolyzed and oxidized through the addition of a mixture of ammonium hydroxide and hydrogen peroxide. Cerium (IV) hydroxide is obtained and admixed with water and nitric acid to yield a slurry. A residue from the slurry is admixed with water to give the cerium oxide colloidal dispersion. The cerium oxide colloidal dispersion is then added to a colloidal dispersion comprising the preferred amorphous zirconium polymer of the formula:

$$[Zr_4(OH)_{12}(X)_2(H_2O)_4]_n(X)_{2n} \cdot 2nH_2O \qquad (I)$$

wherein X is preferably $NO_3^-$. The mixing is done at approximately 15 to 25° C.

In general, the mixed colloidal dispersion of this invention is fiberized by concentrating the mixed dispersion such that it has a viscoelasticity that is suitable for fibre formation by techniques such as spinning, drawing, blowing or extrusion. Preferably, the concentrated mixed colloidal dispersion has a viscosity of at least 0.8 poise, more preferably 0.8 to 5.0 poise and most preferably 0.8 to 2.5.

The fibre diameter is controlled by conventional drawing techniques such as pulling or drawing, centrifugal spinning, nozzle injection or blow spinning. Preferably, the polymer solutions are spray-dried by centrifugal spinning, nozzle injection or disc atomization to give fibres several centimeters long. Most preferably, these fibres have less than 15% non-fibrous material.

The resultant amorphous, green fibres are of a stable dried gel. These green fibres are heat treated, preferably to 500° C., to drive off volatiles to form crystalline fibres comprising zirconium oxide and the selected metal oxide. The crystalline fibres formed have a tetragonal crystal structure. However, as the metal oxide concentration increases beyond 50% by weight of the total equivalent zirconium/metal oxide content, the crystalline fibres tend towards a cubic crystal structure.

Specifically, the mixed colloidal dispersion is capable of being spun into a fibre due to the viscoelastic properties of the zirconium polymer of formula (I) itself. The metal salt solution (or the metal oxide colloidal dispersion) lacks the viscoelastic properties for conversion alone into a fibre. Through addition of the metal salt solution (or the metal oxide colloidal dispersion) to the colloidal dispersion of the zirconium polymer of formula (I), the polymer can act as a spinning aid such that the concentrated mixed colloidal mixture can become viscoelastic and hence, spinnable.

Although the zirconium polymer of formula (I) has a viscoelasticity that is suitable for fibre formation, other spinning agents may be incorporated into the mixed colloidal dispersion such that the synergistic combination of both the zirconium polymer of formula (I) and at least one other spinning agent facilitate fibre formation. Preferably, these other fugitive spinning aids are organic based and hence dissipate during heat treatment. Suitable spinning aids include polyvinyl pyrrolidone, polyethylene oxide, polyvinylalcohol, polyurethane, polyacrylic acid salt, polyacrylamide and polyvinylmethyl ether.

In a preferred embodiment, 1.5% of polyethylene oxide (molecular weight is 5,000,000) is added to the mixed colloidal dispersion.

In general, the fibers may be formed by spraying a conditioned feed using a Mobile Minor spray dryer made by NIRO of Wisconsin, United States. The conditioned feed, for example, may be formed by concentrating a colloidal dispersion such that the dispersion has a viscoelasticity suitable for fibre formation or it may be formed by adding a spinning aid to the colloidal dispersion such that the dispersion has a viscoelasticity suitable for fibre formation. The conditioned feed is pumped at a rate of 1.0 L/hour to the dryer that has been fitted with disc atomization or nozzle injection. The inlet temperature is maintained in the range of 150° C. to 280° C. with the outlet temperature in the range of 80° C. to 110° C.

The following Examples are being submitted to further illustrate various aspects of the present invention. These Examples are intended to be illustrative only and are not intended to limit the scope of the present invention.

EXAMPLES
The Zirconium Polymer of Formula (I)

Example 1

Zirconium carbonate (2.5 kg, 42% by weight zirconium oxide) was added to 0.52 L of nitric acid (15.3 M) with stirring. The mixture was stirred using a Silverson homogeniser to break the lumps of zirconium carbonate. To prevent premature gelation, a further 0.071 L of nitric acid was added. The dispersion was digested at 55° C. to accelerate the formation of the dispersion to a semi-transparent colloidal dispersion of the zirconium polymer of formula (I). The final volume was 1.75 L having a density of 1.70 g/ml and containing 600 g/L zirconium oxide equivalent. The nitrate/zirconium mole ratio was 1.07 and the dispersion had a pH of about 2.0.

Example 2

Zirconium carbonate (1.0 kg, 38% by weight zirconium oxide) was added to 0.197 L of nitric acid (15.5 M) with stirring to yield a main solution. A fraction (0.200 kg) of the zirconium carbonate was separately slurried with water (0.10 L) and vigorously stirred to break down any lumps of paste. This aqueous slurry was added to the main solution and digested at 55° C. to 60° C. to give a clear colloidal dispersion (0.85 L) containing 447 g/L zirconium oxide equivalent. The nitrate/zirconium mole ratio was 1.0 and the dispersion had a pH of about 2.0.

Example 3

Zirconium carbonate (1.0 kg, 38% by weight zirconium oxide) was dispersed in nitric acid (3.05 moles) to yield 0.85 L of a colloidal dispersion of the zirconium polymer of formula (I), which contained 447 g/L of zirconium oxide equivalent. The mole ratio of nitrate/zirconium was 1.0 and the dispersion had a pH of about 2.0. The colloidal dispersion of the polymer had a density of 1.64 g/ml and a viscosity of 0.87 poise. The colloidal dispersion of the polymer was concentrated by evaporation to give a polymer solution that was 40% by weight zirconium oxide equivalent. The dispersion became viscoelastic and continuous fibres could be drawn from it. The fibres gelled with non-sticky surfaces.

Example 4

Using the same procedure as described in Example 3, 1.5% of polyethylene oxide (mwt: 5,000,000 g/mol) was added to the resulting colloidal dispersion of the polymer. The resulting viscosity of the dispersion was 2.5 poise. The dispersion was spray dried to yield a fibre containing less than 15% of a non-fibrous material which is normally referred to as the slot.

Metal Oxide Colloidal Dispersion/Solutions

Example 5

Cerium carbonate (50 g, 99.9% purity) containing 69.3% by weight cerium oxide equivalent was slurried with distilled water (0.1 L) and dissolved by adding nitric acid (38.4 ml; 16 M). The resulting neutral solution was boiled for a few minutes, filtered to remove traces of insoluble matter, and diluted to 1 L with water to give a cerous nitrate solution. A mixture comprising ammonium hydroxide (40 ml, 18 M), hydrogen peroxide (20 ml, "100 volume") and water (160 ml) was added with stirring to the cerous nitrate solution prepared and maintained at 75° C. The resulting insoluble, dark brown cerium (IV) peroxide complex rapidly faded in colour and after the complete addition of the ammonium hydroxide/hydrogen peroxide mixture, a creamy-white precipitate of cerium (IV) hydroxide was obtained having a pH of 7.0.

The precipitate was centrifuged and washed twice by stirring with successive 1 L volumes of distilled water. The separated precipitate was stirred with distilled water (750 ml) and nitric acid (12.5 ml of 16 M) to give a nitric acid/cerium oxide mole ratio of 1. The resulting slurry was boiled for 15 minutes to deaggregate the cerium (IV) hydroxide and give a conditioned slurry. The pH of the conditioned slurry was less than 1.

After cooling the slurry was centrifuged and the residue admixed with distilled water (150 ml) to give a semi-transparent greenish colloidal dispersion.

Example 6

1 kg of cerium (IV) oxide hydrate ("Ceria Hydrate" obtained from Rhône Poulenc) was placed in a saggar and heated for 1 hour in a muffle furnace at 320° C. in air. The resulting dry dispersible cerium compound powder (0.78 kg) had a crystallite size of 59 Å and the nitrate/cerium oxide ratio was 0.14.

100 g of the dispersible cerium compound powder was dispersed by stirring in hot demineralized water to form a colloidal dispersion having a concentration of 645 g/L cerium oxide equivalent. The dispersible cerium compound was 92.1 weight % dispersible in the hot demineralized water.

Example 7

Cerium carbonate was dissolved in nitric acid to give solutions containing 450 g/L of cerium oxide equivalent. The nitrate/cerium oxide mole ratio was 3.0.

Mixed Zirconium/Metal Oxide Colloidal Dispersions

Example 8

The colloidal dispersion of the zirconium polymer of formula (I) was made as described in Example 2. This colloidal dispersion (0.95 L, 427 g of zirconium oxide equivalent) was mixed with a cerium oxide colloidal dispersion (0.375 L, 142 g of cerium oxide equivalent), made as described in Examples 5 or 6, to yield a mixed colloidal dispersion of 75% zirconium oxide and 25% cerium oxide equivalent. No adverse effect, e.g. gelling or significant increase in viscosity, occurred. The mixed colloidal dispersion (1.45 L) had a density of 1.45 g/mL and a viscosity of 0.6 poise was unchanged when aged for several hours. The mixed colloidal dispersion was evaporated to yield a viscosity of at least 0.8 poise such that it may be fiberized.

Example 9

The colloidal dispersion of the zirconium polymer of formula (I) was made as described in Example 2. This colloidal dispersion (0.1 L, density was 1.6 g/ml, 45 g of zirconium oxide equivalent) was mixed with a cerium oxide colloidal dispersion (0.128 L, 1.36 g/ml, 45 g of cerium oxide equivalent), made as described in Examples 5 or 6, to yield a mixed colloidal dispersion of 50% zirconium oxide and 50% cerium oxide equivalent. No adverse effect, e.g. gelling or significant increase in viscosity, occurred. The mixed colloidal dispersion (0.228 L) contained 90 g of mixed oxide.

Example 10

The colloidal dispersion of the zirconium polymer of formula (I) was made as described in Example 2. This colloidal dispersion (1.0 L, 447 g/L of zirconium oxide equivalent) was mixed with a yttrium nitrate solution (0.125 L, 400 g/L of yttrium oxide equivalent), which was made by dissolving yttrium carbonate in nitric acid, to yield a mixed colloidal dispersion of 90% zirconium oxide and 10% yttrium oxide equivalent. No adverse effect, e.g. gelling or significant increase in viscosity, occurred.

Example 11

The colloidal dispersion of the zirconium polymer of formula (I) was made as described in Example 2. This colloidal dispersion (1.0 L, 447 g/L of zirconium oxide equivalent) was mixed with 0.376 L (300 g/L of aluminum oxide equivalent) of an aluminum nitrate solution (made by dissolving aluminum nitrate in water) or an aluminum hydroxy nitrate solution (made by heating solid aluminum nitrate to produce $[Al(OH)_2(NO)_3]_n \cdot xH_2O$ which is dissolved in water) to yield a mixed colloidal dispersion of 75% zirconium oxide and 25% aluminum oxide equivalent. No adverse effect, e.g. gelling or significant increase in viscosity, occurred.

Example 12

The colloidal dispersion of the zirconium polymer of formula (I) was made as described in Example 2. This colloidal dispersion (0.191 L, 448 g/L of zirconium oxide equivalent) was mixed with a SYTON silica colloidal dispersion (adjusted to pH 1.5) (0.138L, 301 g/L of silicon oxide equivalent) to yield a mixed colloidal dispersion of 67.4% zirconium oxide and 32.6% silicon oxide equivalent. The viscosity was 0.13 poise. No adverse effect, e.g. gelling or significant increase in viscosity, occurred.

Mixed Zirconium/Metal Oxide Fibres

Example 13

0.74 L of the mixed colloidal dispersion of Example 9, containing 290 g of mixed oxide equivalent, was blended with 11.5 g of polyethylene oxide (PEO, molecular weight of 400,000) to yield 4.0 weight % PEO based on the mixed oxide equivalent. After mixing to give the required rheology, this feed was filtered through a 150 micron sieve and spray dried using a NIRO Mobile Minor spray dryer. The feed was pumped at a rate of 1.0 L/hour to the dryer that has been fitted with disc atomization or nozzle injection. The inlet temperature is maintained in the range of 150° C. to 280° C. with the outlet temperature in the range of 80° C. to 110° C. The green fibre obtained is then heated to 500° C. to yield the mixed oxide fibre.

Example 14

0.74 L of the mixed colloidal dispersion of Examples 9, 10, 11 or 12, containing 290 g of mixed oxide equivalent, was blended with 4.3 g of polyethylene oxide (PEO, molecular weight of 5,000,000) to yield 1.5 weight % PEO based on the mixed oxide equivalent. After mixing to give the required rheology, this feed was filtered through a 150 micron sieve and spray dried using a NIRO Mobile Minor spray dryer. The feed was pumped at a rate of 1.0 L/hour to the dryer that has been fitted with disc atomization or nozzle injection. The inlet temperature is maintained in the range of 150° C. to 280° C. with the outlet temperature in the range of 80° C. to 110° C. The green fibre obtained is then heated to 500° C. to yield the mixed oxide fibre.

Example 15

The mixed colloidal dispersion of Examples 9, 10 or 11, was evaporated to yield a concentration greater than 600 g/L of mixed oxide equivalent. This feed was spray dried using a NIRO Mobile Minor spray dryer. The feed was pumped at a rate of 1.0 L/hour to the dryer that has been fitted with disc atomization or nozzle injection. The inlet temperature is maintained in the range of 150° C. to 280° C. with the outlet temperature in the range of 80° C. to 110° C. The green fibre obtained is then heated to 500° C. to yield the mixed oxide fibre.

Although preferred embodiments of the invention have been described herein in detail, it will be understood by those skilled in the art that variations may be made thereto without departing from the spirit of the invention or the scope of the appended claims.

What is claimed is:

1. A process for making a zirconium/metal based fibre, said process comprising:
   i) mixing a metal salt solution or metal oxide colloidal dispersion, wherein said metal is selected from the group consisting of at least one of a Group IIA metal, a transition metal, a Group IIIA metal and a Group IIIB metal, with a colloidal dispersion of an amorphous zirconium polymer of the formula:

$$[Zr_4(OH)_{12}(X)_2(H_2O)_4]_n(X)_{2n} \cdot 2nH_2O \qquad (I)$$ 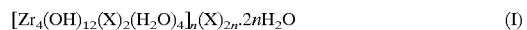

wherein X is a zirconium polymer compatible anion and n is a whole number from 1 to less than 200, to provide a mixed colloidal dispersion; and
   forming the mixed colloidal dispersion into the zirconium/metal based fibre.

2. A process of claim 1 wherein X is selected from the group consisting of $NO_3^-$, $Cl^-$ and $ClCH_2COO^-$.

3. A process of claim 2, further characterized in that said colloidal dispersion of the zirconium polymer has a ratio of X to zirconium in the range of about 1.0 to 0.98 to about 1.0 to 1.3 to maintain said polymer colloidal dispersion.

4. A process of claim 3, further characterized in that said colloidal dispersion of the zirconium polymer has a pH in the range of about 1.5 to about 2.0 to maintain said polymer colloidal dispersion.

5. A process of claim 1 wherein n is a whole number from 1 to about 100.

6. A process of claim 3 wherein said metal is a lanthanide metal.

7. A process of claim 3 wherein said metal is selected from the group consisting of at least one of cerium, yttrium, scandium, magnesium and calcium.

8. A process of claim 3 wherein said metal salt solution is selected from the group consisting of at least one of a metal nitrate, metal chloride, metal acetate and metal perchlorate.

9. A process of claim 3 wherein said metal oxide colloidal dispersion is made from a metal salt substrate selected from the group consisting of at least one of a metal nitrate, metal chloride, metal acetate and metal perchlorate.

10. A process of claim 3 wherein at least one fugitive spinning agent is included in said mixing step.

11. A process of claim 10 wherein said fugitive spinning agent is selected from the group consisting of polyvinyl pyrrolidone, polyethylene oxide, polyvinylalcohol, polyurethane, polyacrylic acid salt, polyacrylamide and polyvinylmethyl ether.

12. A process of claim 11 wherein said fugitive spinning agent is polyethylene oxide.

13. A process of claim 12 wherein said polyethylene oxide has a molecular weight of about 5,000,000 g/mol.

14. A process of claim 13 wherein the amount of said polyethylene oxide is 1.5 weight % of the total equivalent zirconium/metal oxide.

15. A process of claim 3 wherein said mixing step is carried out at a temperature of about 0 to 90° C.

16. A process of claim 15 wherein said mixing step is carried out at a temperature of about 15 to 25° C.

17. A process of claim 3 wherein said metal of said zirconium/metal based fibre is present up to 50 weight % of the total equivalent zirconium/metal oxide.

18. A process of claim 17 wherein said metal of said zirconium/metal based fibre is present up to 25 weight % of the total equivalent zirconium/metal oxide.

19. A process of claim 3, wherein the step of forming said fibre includes: concentrating said mixed colloidal dispersion of step i) such that said mixed colloidal dispersion becomes viscoelastic and forming said mixed viscoelastic colloidal dispersion into said fibre.

20. A process of claim 19 wherein said mixed viscoelastic colloidal dispersion has a concentration ranging from about 300 g/L to 600 g/L.

21. A process of claim 19 wherein said mixed viscoelastic colloidal dispersion has a viscosity of from at least 0.8 poise.

22. A process of claim 19 wherein said mixed viscoelastic colloidal dispersion has a viscosity ranging from about 0.8 poise to 5.0 poise.

23. A process of claim 19 wherein said mixed viscoelastic colloidal dispersion has a viscosity ranging from about 0.8 poise to 2.5 poise.

24. A process of claim 19 wherein said mixed viscoelastic colloidal dispersion is formed into the fibre containing less than 15% of a non-fibrous material.

25. A process of claim 19 wherein X is $NO_3^-$.

26. A process of claim 19, wherein said mixed viscoelastic colloidal dispersion is spun, extruded, drawn or blown into said fibre.

27. A process of claim 19, wherein said mixed viscoelastic colloidal dispersion is spray-dried by centrifugal spinning, nozzle injection or disc-atomization.

28. A process of claim 19, wherein said fibre diameter is controlled by conventional drawing of said mixed viscoelastic colloidal dispersion.

29. A process of claim 19, wherein said metal of said zirconium/metal based fibre is present in up to 50 weight % of the total equivalent zirconium/metal oxide.

30. A process of claim 29 wherein said metal of said zirconium/metal based fibre is present in up to 25 weight % of the total equivalent zirconium/metal oxide.

31. A process of claim 19, wherein said fibre is dried and fired to form a crystalline zirconium oxide/metal oxide fibre.

32. A process of claim 31, wherein said fibre is a zirconium oxide/cerium oxide fibre.

* * * * *

UNITED STATES PATENT AND TRADEMARK OFFICE
CERTIFICATE OF CORRECTION

PATENT NO.    : 6,790,807 B2
DATED         : September 14, 2004
INVENTOR(S)   : James L. Woodhead It is certified that error appears in the above-identified patent and that said Letters Patent is hereby corrected as shown below:

<u>Column 1,</u>
Line 42, replace "$[Zr_4(OH)_{12}(NO_3)_2(H_2O)_4]_n(NO_3)_{2n}0.2nH_2O$" with
-- $[Zr_4(OH)_{12}(NO_3)_2(H_2O)_4]_n(NO_3)_{2n}.2nH_2O$ --.

Signed and Sealed this

Eleventh Day of April, 2006

JON W. DUDAS
*Director of the United States Patent and Trademark Office*